Patented Mar. 24, 1953

2,632,738

UNITED STATES PATENT OFFICE 2,632,738

MANUFACTURE OF ACTIVE CARBON

John W. Hassler and William E. McMinn., Tyrone, Pa., assignors to West Virginia Pulp and Paper Company, New York, N. Y., a corporation of Delaware No Drawing. Application October 12, 1949, Serial No. 121,048

7 Claims. (Cl. 252—421)

Our present invention relates to the manufacture of active carbon. Much of the active carbon now manufactured is derived from the waste liquors from the cooking of wood to form pulp for paper making. This liquor, known in the paper industry as black liquor, contains that portion of the wood which was rendered soluble by cooking it with alkaline solutions, more especially with sodium hydroxide or sodium hydroxide enriched with sodium sulfide. Normally this liquor is concentrated and then burned for the recovery of salts which it contains. When it is processed for the recovery of active carbon it is caused to undergo partial combustion usually in kilns of the rotary type in which the organic material is, for the most part, carbonized. The carbonized material, termed black ash, is then lixiviated to remove the soluble salts and the crude carbon product is then further purified and activated.

Our present invention has for its object a method of increasing the yield of active carbon by incorporating in the black liquor a suitable amount of added organic, i. e., carbonaceous material. Our invention is based upon our discovery that when processed under the same conditions as the organic material in the black liquor, the added carbonaceous material will also yield carbon which is susceptible to the same or comparable degree of activation as the organic material originally present in the black liquor. Apparently the reason for this result is that the salts present in the cooking liquor affect the susceptibility of the produced carbon to activation since if ordinary wood or bark as such be merely carbonized and then subjected to activation in the usual way, a decidedly inferior active carbon is produced.

In carrying out our invention we may incorporate the dried comminuted carbonaceous material in concentrated black liquor of say 55% total solids more or less which is the concentration most employed for combustion. A mixture of as much as 1 part of bark, for example, to 1.5 parts of black liquor of this concentration can be burned to produce suitable black ash. However, such a high percentage of bark results in the formation of a very viscous sludge which is difficult to handle by the usual mechanical means employed for handling black liquor. Therefore unless such special means is available, it is desirable to incorporate somewhat less bark or other comminuted carbonaceous material in the black liquor. Our invention will be best understood by reference to the following specific examples:

*Example 1.*—Dried pine bark was ground in a laboratory ball mill so as to pass an 8-mesh screen. It was thereupon mixed with black liquor at 55% total solids (34 Bé at 60° C.) and 216 grams per liter alkalinity in the ratio of 1 part by weight of pure bark to 10 parts by weight of black liquor. In other words, black liquor solids in the amount of 5.5 parts in black liquor were mixed with 1 part of bark. 100 grams of this mixture was carbonized at 400° C.-500° C. without access to air, and then roasted at from 750°-950° C., this additional oxidation step at the higher temperature rendering the subsequent activation step more effective. The black ash formed was leached with hot water and the crude carbon activated by selective oxidation with steam at 800-950° C., followed by air at from 400-600° C.

The activation was carried to a point where the yield was 3.5% of a mixture started with on a dry basis. The active carbon so produced gave a molasses value of 83. When 100 grams of the same black liquor containing no bark was processed in the same manner, the carbon produced had a similar molasses value of 83 and with approximately the same recovery. Although the recovery was approximately the same in both instances, the yield was greater in the case of the mixture containing bark because of the higher concentration of the organic material in the starting substances. Similar experiments with ground hardwood bark gave equally satisfactory results.

The molasses test is one much used by sugar refineries for evaluating active carbon, and it is particularly indicative of the ability of the carbon to remove color bodies from many other products. Inasmuch as different batches of blackstrap molasses vary in composition depending on the source from which they are obtained, it is difficult to standardize the exact experimental conditions, particularly the concentration. Because of this, the molasses value (M. V.) represents the relative value of one carbon in terms of a reference carbon. The molasses values stated here are all based on a comparison to the same standard commercial active carbon.

*Example 2.*—Wood sawdust undried and containing 40% moisture and passing a 4-mesh screen was added to a screw conveyor carrying black liquor to a rotary kiln in the pulp mill in varying amounts to produce a feed mixture to the rotary kiln of from 0.16 pound sawdust per gallon of black liquor to 0.64 pound per gallon. After burning in the rotary kiln at maximum temperatures of from 900-1100° C., the black ash produced was activated in the manner described in Example 1.

The following results were obtained:

| Lbs. sawdust per gallon B. L. | Final lbs. carbon in 100 lbs. black ash | Iodine Value, percent |
|---|---|---|
| 0 | 30.6 | 50.4 |
| 0.16 | 31.2 | 54.5 |
| 0.16 | 29.4 | 49.4 |
| 0.32 | 30.6 | 61.6 |
| 0.32 | 33.8 | 55.6 |
| 0.48 | 35.0 | 73.9 |

At this stage of the process, the carbon has very little ability to adsorb molasses color, but a test known as the iodine test is of value in indicating whether the carbon at this stage can be subsequently activated to produce a satisfactory decolorizing carbon for molasses. In general, the higher the iodine value, the more readily does the carbon activate and the data in the table indicate that increasing amounts of sawdust in the black liquor gave an equal or greater iodine value and hence produced a product that would be readily activated in a subsequent activation. This conclusion was confirmed since the leacher from the black ash was satisfactorily activated in plant operation.

For the carrying out of the method according to this example it is desirable to insure thorough mixing of the black liquor and added finely divided carbonaceous material. For this purpose a dough or plaster mixer or other similar type apparatus may be used, which will fold in the finely divided solid material in the black liquor.

*Example 3.*—Samples of bituminous coal occurring locally (Tyrone, Pa.) were finely ground and mixed with black liquor of 55% total solids (34 Bé. at 60° C.) and 216 grams per litre causticity, after which the mixture was carbonized and subjected to activation at high and low temperatures. The following schematic representation shows the steps performed:

Black liquor, 770 grams.

Coal, 55 grams.

↓

Carbonized at 400–500° C.

↓

Roasted at 850° C.

↓

Quenched—water washed.

↓

Yield—char, 111 grams.

↓

Acid washed.

↓

High temperature activation to 900° C. in presence of air.

↓

Recovery, 70%.

↓

Low temperature activation at 400–600° C. with 50% recovery.

30 grams of finished product having an M. V. (molasses value) of 90.

When the acid washing step was omitted, with the other steps remaining the same, an M. V. of 58 was had.

The M. V. value of 90 above obtained was superior to the value obtained by processing coal alone in the same manner, a typical value for which with conditions otherwise substantially the same is 40 M. V.

It will be noted that when carrying out the invention on a laboratory scale it is preferred to conduct the preparation of the black ash in two stages, i. e., a charring stage in which the heating is done without access to air, and a roasting stage where air is admitted. Thereby the charring may be done without appreciable oxidation, which is desirable since oxidation at lower temperatures is not as effective in producing a final activated product as is oxidation at the higher temperatures. When operating on a commercial scale, on the other hand, the operations of charring and roasting may be combined, since the charring will take place so rapidly that any oxidation taking place will not affect the result appreciably.

It will be seen from the foregoing that when carbonaceous material, as represented by bark and sawdust, was added to black liquor and the mixture processed to obtain activated carbon, the degree of activation of the carbon obtained was on the whole greater than when the black liquor alone was used. The use of coal as an extender gave a product that was within the range obtainable from black liquor solids alone with substantially the same degree of burning away of the carbon present. Provided that not substantially more than one part of bark, for example, is used to ten parts by weight of black liquor of 55% solids, the parts being by weight, little change in the normal process of making active carbon from black liquor is required, such additional steps being merely the grinding of the bark or other extender, screening it and mixing it with black liquor.

We claim:

1. In the method of making active carbon from black liquor in which the black liquor is concentrated, burned to black ash, the carbon recovered therefrom and activated, the improvement which consists in: admixing with the concentrated black liquor comminuted carbonaceous material to form a substantially homogeneous flowable mixture, such carbonaceous material serving as an extender for the carbon contained in the black liquor, and increasing the yield of active carbon obtained.

2. The method according to claim 1 in which the added carbonaceous material is bark.

3. The method according to claim 1 in which the added carbonaceous material is coal.

4. The method according to claim 1 in which the added carbonaceous material is bark in the proportions of approximately 5.5 parts black liquor solids in black liquor to 1 part of bark.

5. In the method of making active carbon the steps which consist in: admixing concentrated black liquor with comminuted bark in the proportion of not substantially more than 1 part by weight of bark to 5.5 parts of black liquor solids in black liquor, to form a substantially homogeneous flowable mixture subjecting the mixture to partial combustion at a temperature not substantially less than 400° C. and not substantially in excess of 500° C. and then roasting at not substantially less than 750° C. and not substantially more than 950° C., leaching the product so formed to remove water soluble salts, then activating the carbonized material so obtained.

6. In the method of making active carbon the steps which consist in: admixing concentrated black liquor with comminuted coal to form a substantially homogeneous flowable mixture, carbonizing the mixture at a temperature not substantially less than 400° C. and not substantially above 500° C., then roasting same at a temperature not substantially less than 750° C. and not substantially more than 950° C., leaching the product so produced to remove soluble salts, then activating by heating to not substantially less than 800° C. and not substantially beyond 900° C. in the presence of air.

7. In the method of making active carbon, the steps which consist in: admixing concentrated black liquor with comminuted carbonaceous material in the proportion of not substantially more than one part comminuted material to 5.5 parts of black liquor solids in black liquor, to form a substantially homogeneous flowable mixture subjecting the mixture to partial combustion at maximum temperatures substantially in the range of 900 to 1100° C., leaching the product so formed to remove water soluble salts, and then activating the carbonized material so obtained.

JOHN W. HASSLER.
WILLIAM E. McMINN.

REFERENCES CITED

The following references are of record in the file of this patent:

UNITED STATES PATENTS

| Number | Name | Date |
| --- | --- | --- |
| 1,383,755 | Punnett et al. | July 5, 1921 |
| 1,462,752 | Jacobs | July 24, 1923 |
| 1,483,160 | Creighton | Feb. 12, 1924 |
| 1,504,730 | Whitaker | Aug. 12, 1924 |
| 1,527,083 | Schmidt | Feb. 17, 1925 |
| 1,547,037 | Hene | July 21, 1925 |

FOREIGN PATENTS

| Number | Country | Date |
| --- | --- | --- |
| 435,345 | Great Britain | Sept. 19, 1935 |